US012755544B2

(12) United States Patent
Johansson

(10) Patent No.: US 12,755,544 B2
(45) Date of Patent: Oct. 6, 2026

(54) DATA PROCESSING METHOD, SYSTEM AND COMPUTER PROGRAM PRODUCT IN VIDEO PRODUCTION OF A LIVE EVENT

(71) Applicant: SPIIDEO AB, Malmö (SE)

(72) Inventor: Örjan Johansson, Lund (SE)

(73) Assignee: SPIIDEO AB, Malmo (SE)

( * ) Notice: Subject to any disclaimer, the term of this patent is extended or adjusted under 35 U.S.C. 154(b) by 286 days.

(21) Appl. No.: 18/577,256

(22) PCT Filed: Jul. 7, 2022

(86) PCT No.: PCT/SE2022/050692
§ 371 (c)(1),
(2) Date: Jan. 6, 2024

(87) PCT Pub. No.: WO2023/282835
PCT Pub. Date: Jan. 12, 2023

(65) Prior Publication Data

US 2024/0378891 A1 Nov. 14, 2024

(30) Foreign Application Priority Data

Jul. 8, 2021 (EP) .................................... 21184599

(51) Int. Cl.
*G06V 20/52* (2022.01)
*G06F 18/25* (2023.01)
*G06V 40/16* (2022.01)

(52) U.S. Cl.
CPC ............ *G06V 20/52* (2022.01); *G06F 18/256* (2023.01); *G06V 40/169* (2022.01)

(58) Field of Classification Search
None
See application file for complete search history.

(56) References Cited

U.S. PATENT DOCUMENTS 10,834,305 B2 * 11/2020 Linderoth ............ H04N 23/695
11,283,983 B2 * 3/2022 Linderoth ............ H04N 23/695
(Continued)

FOREIGN PATENT DOCUMENTS

CN 108537094 A 9/2018
WO 2020023801 A1 1/2020

OTHER PUBLICATIONS

International Search Report corresponding to PCT/SE2022/050692 mailed Sep. 12, 2022.
(Continued)

*Primary Examiner* — Nancy Bitar
(74) *Attorney, Agent, or Firm* — Sandberg Phoenix & von Gontard, PC

(57) ABSTRACT

A data processing method (100) in video production of a live event involving a plurality of persons acting in a real-world target field is disclosed. The method (100) comprises: receiving (110) wireless communication signals that contain respective sensor data (24) including motion-triggered data; processing (120) the motion-triggered data to determine first movement patterns; obtaining (130) a video stream of a real-world target field (20); processing (140) the video stream to determine second movement patterns; analyzing (150) the first movement patterns and the second movement patterns for matches between them; and for each particular second movement pattern that matches a particular first movement pattern, identifying (160) a person having the particular second movement pattern as being associated with the sensor data that comprises motion-triggered data from which the particular first movement pattern was determined.

14 Claims, 6 Drawing Sheets

(56) References Cited

U.S. PATENT DOCUMENTS

| | | | | |
|---|---|---|---|---|
| 12,439,133 | B2 * | 10/2025 | Larsson | G06V 20/41 |
| 2007/0279494 | A1 * | 12/2007 | Aman | H04N 5/262<br>348/169 |
| 2009/0209343 | A1 | 8/2009 | Foxlin et al. | |
| 2010/0283630 | A1 | 11/2010 | Alonso | |
| 2012/0294366 | A1 * | 11/2012 | Eliyahu | H04N 19/43<br>375/E7.123 |
| 2013/0142384 | A1 | 6/2013 | Ofek | |
| 2013/0148861 | A1 * | 6/2013 | Ferlatte | G06V 20/42<br>382/107 |
| 2014/0193040 | A1 | 7/2014 | Bronshtein | |
| 2014/0226855 | A1 | 8/2014 | Savvides et al. | |
| 2014/0245367 | A1 * | 8/2014 | Sasaki | H04N 21/2343<br>725/109 |
| 2015/0085111 | A1 | 3/2015 | Lavery | |
| 2015/0163764 | A1 | 6/2015 | Stern et al. | |
| 2016/0379684 | A1 | 12/2016 | Anderson et al. | |
| 2017/0265785 | A1 * | 9/2017 | Vaughn | A61B 5/7267 |
| 2018/0322330 | A1 | 11/2018 | Liu et al. | |
| 2018/0350084 | A1 | 12/2018 | Tamir et al. | |
| 2019/0080157 | A1 | 3/2019 | Lev et al. | |
| 2019/0095736 | A1 * | 3/2019 | Stahlfeld | G06F 3/011 |
| 2020/0215410 | A1 * | 7/2020 | Li | A63B 24/0021 |
| 2021/0315084 | A1 * | 10/2021 | Deixler | H05B 47/115 |

OTHER PUBLICATIONS

Written Opinion corresponding to PCT/SE2022/050692 mailed Sep. 12, 2022.

Extended European Search Report from corresponding EP App. 2118459905 mailed Feb. 17, 2022.

* cited by examiner

DATA PROCESSING METHOD, SYSTEM AND COMPUTER PROGRAM PRODUCT IN VIDEO PRODUCTION OF A LIVE EVENT

CROSS-REFERENCE TO RELATED APPLICATIONS

This application is the US National Stage under 35 USC § 371 of International App. No. PCT/SE2022/050692 filed 7 Jul. 2022, which claims priority to European App. No. 21184599.5 filed 8 Jul. 2021, both of which are incorporated herein by reference.

TECHNICAL FIELD

The present disclosure is related to video production of a live event. More specifically, a method, system and a computer program product in video production of a live event are disclosed herein.

BACKGROUND

Popular real-world events, such as sports events or other recreational events with public interest, are typically being recorded by one or more video cameras. The recordings are then assembled in a video production. The video production may be streamed out to users so that they can enjoy the event as a live viewing experience. Alternatively, the video production may be used for coaches and professionals to evaluate a team's or an athlete's performance, develop individual athlete skills and improve overall sports results.

At the sports field, arena, or location of the event, there are often a plurality of persons acting. This is particularly the case for team sports. In order to properly evaluate a person's performance, his or her movements and actions have to be tracked so as to distinguish the analysed person from other persons. This is particularly useful for situations in which it is desired to mark, highlight, or in some other way provide persons with visual indicators for augmenting the video production or visualizing various types of useful information.

Modern video analysis tools include technologies for tracking a person's movement and actions in a sports field. These technologies typically involve equipping each person on the field with a heart rate monitor and a geopositioning unit. The data received from the geopositioning unit can therefore be used for associating movement of a player with heart rate data obtained by the heart rate monitor. Not only does such a solution require persons to be equipped with geopositioning sensors, they furthermore have plenty of restrictions related to poor tracking accuracy. In alternative solutions, some video analysis tools apply object recognition technologies for visual tracking of persons in the field. These technologies attempt to capture a visual identifier on a person, e.g. a shirt number, for singling out and distinguishing the different persons on the field. However, these solutions also have some setbacks that can affect the identification accuracy. For instance, identification limitations may occur in groups of several persons or when a person turns, rotates or spins which leads to the camera not being able to capture the visual identifier. Furthermore, visual tracking technologies require persons to always wear the particular type of visual identifier, which is unrealistic particularly in training scenarios.

In light of the observations above, the present inventor has realized that there is room for improvements related to tracking of individual persons in, for instance, a sports field.

SUMMARY

An object is therefore to provide a solution to, or at least a mitigation of, one or more of the problems or drawbacks identified in the background section above.

In a first aspect, a data processing method in video production of a live event involving a plurality of persons acting in a real-world target field is provided. The method comprises receiving wireless communication signals that contain respective sensor data obtained for the plurality of persons, the sensor data including motion-triggered data for each person; processing the motion-triggered data in the received wireless communication signals to determine respective first movement patterns for at least some of the plurality of persons as they act in the real-world target field; obtaining a video stream of the real-world target field; processing the video stream to determine respective second movement patterns for at least some of the plurality of persons as they act in the real-world target field; analyzing the first movement patterns and the second movement patterns for matches between them; and for each particular second movement pattern that matches a particular first movement pattern, identifying a person having the particular second movement pattern as being associated with the sensor data that comprises the motion-triggered data from which the particular first movement pattern was determined.

In one or more embodiments, the motion-triggered data in the sensor data obtained for each person are data from a gyro, accelerometer, magnetometer or inertial measurement unit comprised in a sensor device attached to the body of the person.

In one or more embodiments, in addition to motion-triggered data, the sensor data obtained for each person also comprises biometrical data.

In one or more embodiments, the method further comprises producing an output video stream from the video stream, the output video stream having one or more computer-generated visual augmentations associated with one or more of the identified persons.

In one or more embodiments, the one or more computer-generated visual augmentations include a reproduction of some or all of the biometrical data obtained for the identified person.

In one or more embodiments, the one or more computer-generated visual augmentations include a reproduction of some or all of the motion-triggered data obtained for the identified person.

In one or more embodiments, the method further comprises streaming the output video stream onto a data network for allowing a plurality of client devices to receive and present the output video stream on a display of each client device.

In one or more embodiments, the analyzing of the first movement patterns and the second movement patterns for matches between them comprises generating a machine learning based correlation factor, the machine learning based correlation factor being trained on said motion-triggered data and said video stream, the machine learning based correlation factor recognizing one or more correlations between the first and second movement patterns; and associating the one or more correlations with a relevance level including normalized values of different actions associated with the plurality of persons acting in the real-world target field (20), wherein said one or more correlations are sorted based on respective relevance levels.

In one or more embodiments, the motion-triggered data in the sensor data as well as video frames of the obtained video stream comprise time stamps, and wherein the analyzing of the first movement patterns and the second movement patterns for matches between them is temporally confined by use of the time stamps.

In one or more embodiments, based on the machine learning based correlation factor, the method further comprises defining a pattern matching threshold as a predetermined value being indicative of a minimum performance requirement of the analyzing step; and adjusting the time stamps of the motion-triggered data and/or the video frames upon the machine learning based correlation factor being below the pattern matching threshold.

In one or more embodiments, the processing of the video stream to determine respective second movement patterns for at least some of the plurality of persons as they act in the real-world target field involves: applying image recognition and object tracking functionality to a sequence of video frames of the video stream to single out and track different persons acting in the field; and deriving the respective second movement patterns from an output of the image recognition and object tracking functionality.

In one or more embodiments, the sensor data comprises a unique identifier being adapted to uniquely distinguish a person among the plurality of persons appearing in the video stream, the method further comprising analyzing the unique identifier for resolving ambiguities of said person among the plurality of persons appearing in the video stream.

In one or more embodiments, the unique identifier is used for resolving ambiguities resulting from a temporary incapability of the image recognition and object tracking functionality to single out and track different persons acting in the field in the sequence of video frames of the video stream.

In one or more embodiments, the method further involves improving the performance of the image recognition and object tracking functionality based on feedback received from matches between the first and second movement patterns.

In one or more embodiments, wherein upon no match between the first and second movement patterns having been established for a particular time, the method further involves postponing a next iteration of the identifying of a person until one of a new first or second movement pattern has been determined.

A second aspect is a data processing system in video production of a live event involving a plurality of persons acting in a real-world target field is provided. The system comprises: a data receiving unit configured to receive wireless communication signals that contain respective sensor data obtained for the plurality of persons, the sensor data including motion-triggered data for each person; a sensor data processing unit configured to process the motion-triggered data in the received wireless communication signals to determine respective first movement patterns for at least some of the plurality of persons as they act in the real-world target field; a video obtaining unit configured to obtain a video stream of the real-world target field; a video processing unit configured to process the video stream to determine respective second movement patterns for at least some of the plurality of persons as they act in the real-world target field; a movement pattern analysis unit configured to analyze the first movement patterns and the second movement patterns for matches between them; and a pattern identification unit configured to, for each particular second movement pattern that matches a particular first movement pattern, identify a person having the particular second movement pattern as being associated with the sensor data that comprises the motion-triggered data from which the particular first movement pattern was determined.

In one or more embodiments, the system is further configured for performing the functionality of the method recited in any of the embodiments of the first aspect.

A third aspect is a computer program product comprising computer code for performing the method according to the first aspect or any one of the embodiments thereof when the computer program code is executed by a processing device is provided.

The data processing method, system and computer program product according to the first, second and third aspects provide technical effects related to accurate person tracking in a field when a plurality of persons are acting, even when they are located very close to each other. The tracking is furthermore not dependent on the usage of geolocalisation techniques, which eliminates some of the setbacks of current person tracking technologies. Moreover, with the utilization of matching movement patterns related to sensor data as well as video data, the technology is not reliant on being able to visually distinguish one person from another at all times. Similarly, accurate sensor readings may not be required at all times, considering that the video tracking may complement the motion-triggered data in situations where sensors are unable to generate correct signals. Additionally, the method according to the first aspect may provide an enriched and extended information viewing experience, wherein users may be provided with visual information related to player's current biometrical and/or motion-related features. The visual information can furthermore serve as a great tool for coaches or other professionals to observe player health and other physical attributes not only during matches, but also during training, so as to improve the players' overall performance and well-being.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The foregoing will be apparent from the following detailed description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION OF EMBODIMENTS

Figure 1A:
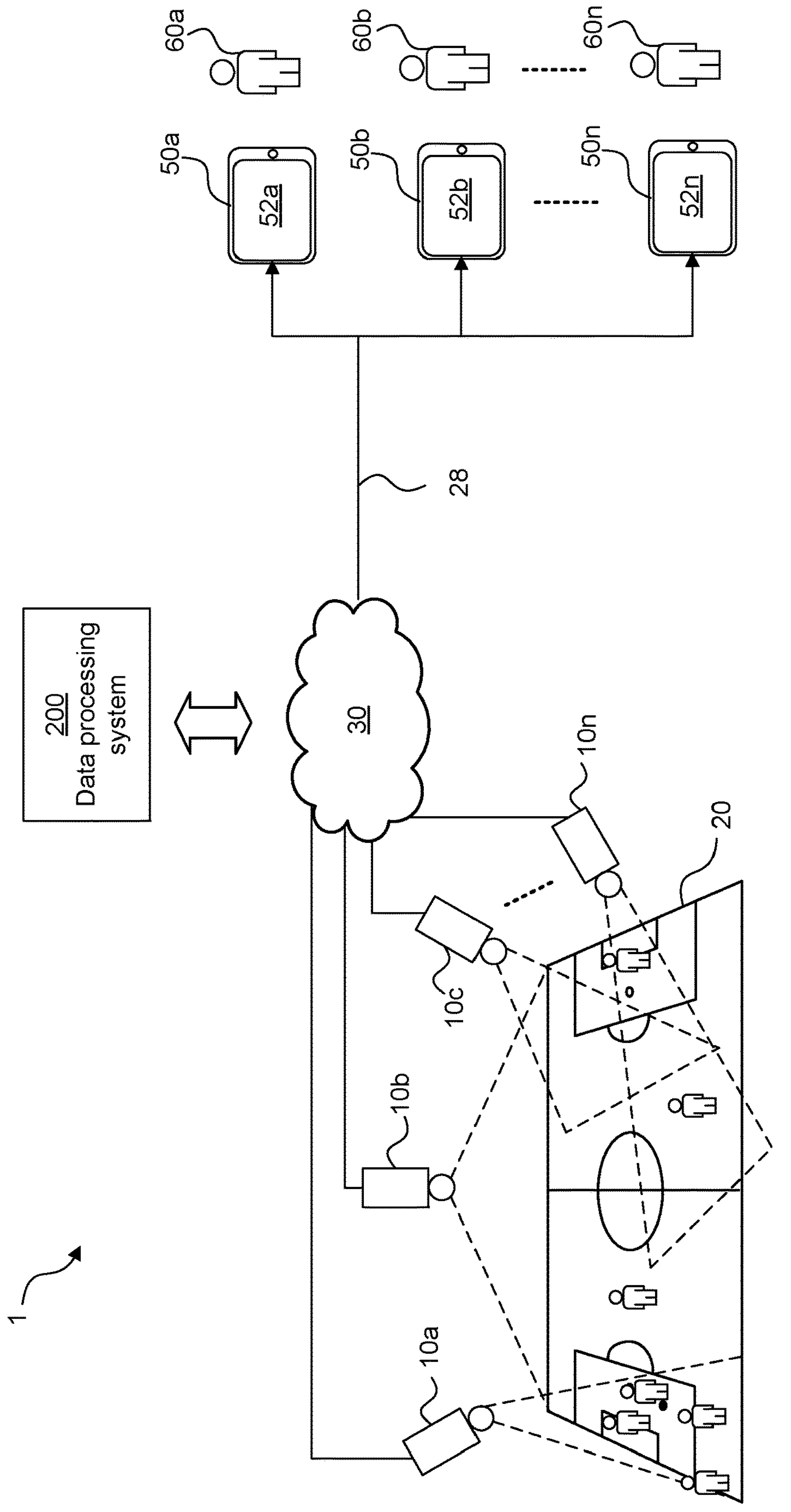
FIG. 1A is a schematic view of a video system for providing a video production of a live event.

Embodiments of the data processing method and system will now be described with reference to the accompanying drawings. The data processing method and system may, however, be embodied in many different forms and should not be construed as limited to the embodiments set forth herein; rather, these embodiments are provided so that this disclosure will be thorough and complete, and will fully convey the scope of the claimed invention to those skilled in the art. The terminology used in the detailed description of the particular embodiments illustrated in the accompanying drawings is not intended to be limiting of the claimed invention. In the drawings, like numbers refer to like elements.

FIG. 1A discloses an embodiment of a video production system 1 comprising a data processing system 200. The data processing system 200 is used in video production of a live event which involves a plurality of persons acting in a real-world target field 20. The data processing system 200 may be adapted to provide an output video stream 28 for a plurality of client devices 50*a-n*, operated by associated users 60*a-n*, over a data network 30. The data network 30 may, for instance, be a wide-area network or aggregation of networks which form part of the Internet (commonly also referred to as the Cloud). The video production system 1 may comprise one or more video cameras 10*a-n* being adapted to obtain recordings of a real-world target field 20, or subareas thereof. The data processing system 200 may be configured to obtain a video stream of the real-world target field 20. In one embodiment, the video stream reflects the recordings obtained by the one or more video cameras 10*a-n* of the video production system 1. Alternatively, the video stream may be obtained from some other video input source.

The output video stream 28 is based on the video stream obtained by the data processing system 200. The output video stream 28 is to be interpreted as a video stream that has been augmented with additional computer-generated visual information that is associated with how the identified persons in the video stream appear. For instance, computer-generated visual information may include e.g. markings, colorings, shadings, highlights, animations, or other types of visual indicators for augmenting a player's appearance or information associated with the players. Information associated with players may relate to sensor-retrieved data of biometrics of the players. Examples of computer-generated visual information will be described in more detail with reference to FIGS. 3-4.

The video stream may reflect real-world events occurring within and/or around the real-world target field 20, or subareas thereof. In the shown example, the real-world target field 20 is depicted as a football (soccer) arena. This is just an example, as the real-world target field 20 may practically be any type of field having events occurring therein and being associated with e.g. a sport or a recreational activity of public interest. For instance, the real-world target field 20 may alternatively be any other type of sports arena, a skiing slope, a skateboard park, a theatre hall, festival grounds, and so forth. A subarea thereof is thus to be interpreted as any portion, of an arbitrary size, of the real-world target field 20. Hence, a subarea may, for instance, be 1%, 10%, 50% or 90% of the entire real-world target field 20, one third of the rightmost penalty box, the northern supporter stands, the area surrounding one or more persons on the field 20, and so forth. One or more of the subareas may be overlapping at some portions of the real-world target field 20, or be completely separate from another.

The video cameras 10*a-n* may comprise means for outputting data, e.g. captured video recordings, onto the data network 30. For instance, data communication may be based on any long-range or short-range wireless communication standards known in the art, including but not limited to W-CDMA/HSPA, GSM, UTRAN, LTE, 3G, 4G, 5G, ZigBee, WirelessHART, WiFi, Bluetooth®, BLE, RFID, WLAN, mesh communication, to name a few. The one or more video cameras 10*a-n* may comprise an ultra-wide view network video camera, covering the entire target field 20 or subareas thereof. Alternatively, the one or more video cameras 10*a-n* may comprise a plurality of camera units operating in conjunction and positioned at approximately the same location for capturing respective views of the target field 20, the respective views being combined (stitched together) by the data processing system 200 into a single video recording of the target field 20. Alternatively, the one or more video cameras 10*a-n* may comprise either one or a combination of PTZ cameras, mobile phone cameras, compact cameras, DSLR cameras, action cameras, drone cameras, spidercams, 4K/HD live cameras, HD system cameras, HD/SD system cameras, or any other type of camera that can be adapted to cover at least a subarea of the real-world target field 20 and output the recording onto the data network 30. In one embodiment, the one or more video cameras 10-*n* may be adapted to operate autonomously, i.e. independently of the other video cameras 10*a-n*. Hence, each video camera 10*a-n* may be implemented to output the associated video recording according to best-effort delivery practice.

In one embodiment, the video stream may comprise respective raw video segments. Each such raw video segment may contain recorded video contents, for instance, in the form of H.264 or H.265 encoded video data.

The data processing system 200 may be adapted to act as a service bridge between the one or more video cameras 10*a-n* and the users 60*a*-60*n* via the data network 30. The data processing system 200 may be implemented as a cloud-based server implemented by known technologies, such as Amazon Web Services, Google Cloud Platform, Microsoft Azure, DigitalOcean, Oracle Cloud Infrastructure, IBM Bluemix or Alibaba Cloud. The cloud-based server may be included in a distributed cloud network that is widely and publically available, or alternatively limited to an enterprise. Other alternative server configurations may be realized based on any type of client-server or peer-to-peer (P2P) architecture. Server configurations may thus involve any combination of e.g. web servers, database servers, email servers, web proxy servers, DNS servers, FTP servers, file servers, DHCP servers, to name a few.

Figure 1B:
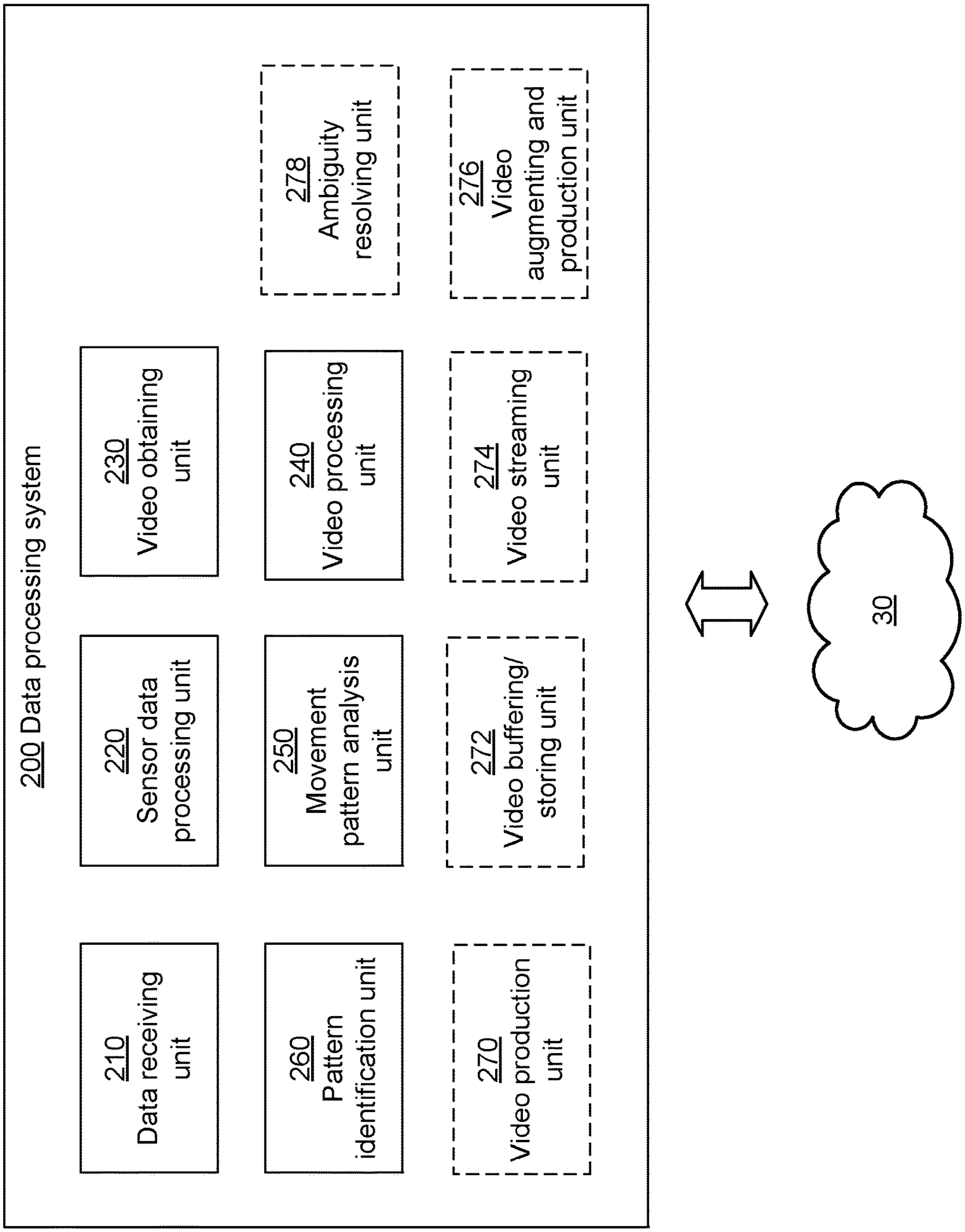
FIG. 1B is a schematic block diagram of a data processing system according to one embodiment.

With reference to FIG. 1B, a detailed block diagram of the data processing system 200 is shown. The data processing system 200 comprises a number of units (or modules, or devices) which shall be seen as functional elements rather than structural or physical; they may be structurally implemented for instance by one or more server computers with suitable operating system, software and networking access capabilities. A corresponding data processing method 100, which may be performed by the data processing system 200, is presented in FIG. 5.

As seen in FIG. 1B, the data processing system 200 comprises a data receiving unit 210. The data receiving unit 210 is configured to receive wireless communication signals that contain respective sensor data obtained for a plurality of persons on the target field 20, wherein the sensor data includes motion-triggered data for each person (cf. step 110 in FIG. 5). The wireless communication signals comprising the sensor data may be transmitted to the data processing unit 200 using any known long-range or short-range wireless communication standards, including but not limited to W-CDMA/HSPA, GSM, UTRAN, LTE, 3G, 4G, 5G, ZigBee, WirelessHART, WiFi, Bluetooth®, BLE, RFID, WLAN, mesh communication, to name a few.

Motion-triggered data is related to movement and actions of persons acting in the real-world target field 20. Accordingly, any event performed by any person that causes a sensor value to be read also causes the data processing system 200 to obtain motion-triggered data related to said event. The motion-triggered data may be retrieved from one of or a combination of a gyro, accelerometer, magnetometer or inertial measurement unit (IMU) comprised in a sensor device that is attached to the body of each respective person. Alternatively, the sensor device may be associated with the respective person in some other way, given that the sensor data can be appropriately read for the respective person. The motion-triggered data may, for instance, include min, max or mean acceleration, velocity, angular, rotation, roll, pitch and/or yaw data, including magnitudes thereof. The sensor device may be a training belt, a training vest, a smartwatch, or any similar device that is capable of containing, carrying or hosting sensor units for obtaining sensor data related to motion-triggered events.

In preferred embodiments, the sensor data may further comprise biometrical data. Correspondingly, the sensor device may comprise one or more units capable of obtaining data related to biometrical features of the associated person. The sensor device may be adapted to obtain biometrical data at any given time whenever a person is equipped with the sensor device and said units capable of obtaining data related to biometrical features can perform appropriate readings. The biometrical data may, for instance, include heart rate, ECG data, body temperature, oxygen saturation levels, body surface humidity levels, EPOC data, VO2 data, respiration data, stress level data, and/or any other type of suitable biometrical features.

The data processing system 200 comprises a sensor data processing unit 220. The sensor data processing unit 220 is configured to process the motion-triggered data in the received wireless communication signals. The processing involves determining respective first movement patterns for at least some of the plurality of persons as they act in the real-world target field 20 (cf. step 120 in FIG. 5). The motion-triggered data is typically unorganized and comprises varying levels of noise. To interpret the noisy and unorganized motion-triggered data, the sensor data processing unit 220 may be configured to apply one or more preprocessing and/or noise reduction methods known in the art. Furthermore, the sensor data processing unit 220 may be further configured to perform one or more feature extraction and/or feature selection method(s) for generation of the first movement patterns. Accordingly, upon the sensor data processing unit 220 having processed the obtained motion-triggered data, first movement patterns for each one of the analysed persons have been acquired. This allows for the respective first movement patterns to be used for a precise distinguishing of one person's movement and actions from another.

The data processing system 200 comprises a video obtaining unit 230. The video obtaining unit 230 is configured to obtain a video stream of the real-world target field 20 (cf. step 130 in FIG. 5). The video stream may be obtained from the one or more video cameras 10*a-n*, or alternatively from any other type of input video source. For embodiments where the video obtaining unit 230 receives raw video recordings from the one or more video cameras 10*a-n*, the video stream will first have to be produced. The data processing system 200 may thus comprise a video production unit 270 and a video buffering/storing unit 272. These units may produce, store and/or buffer the individual video frames according to techniques that are known in the art.

The data processing system 200 comprises a video processing unit 240. The video processing unit 240 is configured to process the obtained video stream. Processing the obtained video stream involves determining respective second movement patterns for at least some of the plurality of persons as they act in the real-world target field 20 (cf. step 140 in FIG. 5).

In one embodiment, the determining of respective second movement patterns may involve applying image recognition and/or object tracking functionality to a sequence of video frames of the video stream. Accordingly, the video processing unit 240 is capable of singling out and distinguishing one person from another while they act in the field 20. Moreover, the video processing unit 240 may be further configured to derive the respective second movement patterns from an output of the image recognition and/or object tracking functionality applied to the sequence of video frames of the video stream.

In one embodiment, the image recognition and/or object tracking functionality is implemented as an edge AI unit at each one of the cameras 10*a-n*, wherein the tracking/recognition is performed prior to the data processing system 200 having received the video stream. Alternatively, the video processing unit 240 is configured to perform the tracking/recognition. The image recognition and/or object tracking functionality may be implemented using any commonly known algorithm, such as e.g. R-CNN, Fast/Faster R-CNN, HOG, R-FCN, SSD, SPP-net or YOLO, or similar.

The data processing system 200 further comprises a movement pattern analysis unit 250. The movement pattern analysis unit 250 is configured to receive the respective first and second movement patterns from the sensor data processing unit 220 and the video processing unit 240. Moreover, the movement pattern analysis unit 250 is configured to analyze the first and second movement patterns for matches between them (cf. step 150 in FIG. 5).

In one embodiment, the movement pattern analysis unit 250 is configured to generate a machine learning based correlation factor. The machine learning based correlation factor may be generated by applying any machine learning algorithms known in the art to the first and the second movement patterns, such as supervised or unsupervised learning algorithms including but not limited to regression algorithms, decision trees, K-means, K-nearest neighbors, neural networks, support vector machines or principal component analyses. Accordingly, the machine learning based correlation factor may be trained based on the motion-triggered data and video data (e.g. outputs of the sensor data processing unit 220 and the image recognition and/or object tracking functionality of the video processing unit 240). The movement pattern analysis unit 250 may thus be trained to correlate the first movement pattern with the second movement pattern. The machine learning based correlation factor is adapted to recognize one or more correlations between the first and second movement patterns.

To this end, the machine learning based correlation factor is an output of the selected machine learning algorithm. Using a regression algorithm, the factor may be a true or false value, for instance "1" or "0". Using a classification algorithm, the factor may be an arbitrary value representing a probability of the input being related to a particular class, for instance "97%", or any other value being indicative of how much the first and second movement patterns are related to one another. Using text summarization, the factor may be a text being indicative of certain information, for instance "first and second movement patterns do/do not correlate". Other reasonable interpretations of a machine learning based correlation factor may be realized.

In one embodiment, the one or more correlations may be associated with a relevance level. The relevance levels may include normalized values of different actions associated with individuals on the real-world target field 20. For instance, the normalized values may be indicative of how important, unique, prevalent, etc., one particular type of action is in relation to another. Hence, different actions e.g. varying degrees of limp legs, bow-legged, knock-knees, restricted left arm movement, unnatural head movement, and so forth, may be associated with different normalized values as they may be of various importance. The correlations may thus be sorted based on respective relevance levels.

The machine learning based correlation factor and/or the sorted correlations based on relevance levels may improve the overall correlation accuracy of the movement pattern analysis unit 250. This may be a particularly useful approach for handling motion-triggered data and/or video data comprising different data formats, extensions, definitions, protocols, and so forth. The movement pattern analysis unit 250 is thus operable and capable of producing accurate matching results regardless of input type, given that the inputs are associated with motion-triggered data and video data, respectively, of persons acting in the real-world target field.

In one embodiment, each video frame of the video stream comprises a time stamp. Moreover, the motion-triggered data in the sensor data also comprises a time stamp. Time stamping of data are, as such, based on technologies known in the art and details thereof will accordingly not be given much attention herein. However, in this embodiment, the movement pattern analysis unit 250 is configured to analyze the first and second movement patterns by a temporal confinement based on the respective timestamps. The temporal confinement of the video frames and the motion-triggered data may assist the movement pattern analysis unit 250 in accurately identifying matches between the first and second movement patterns.

In one embodiment, the first movement patterns comprise a first time stamp and the second movement patterns comprise a second time stamp. The time stamp is a sequence of characters or encoded information that temporally identifies when a certain event occurs, e.g. a particular motion of a person. If the first and second time stamps match each other, i.e. that they occur generally at the same time, it can be said that they match and a person can accordingly be identified among a plurality of persons. More advanced embodiments can of course be realized, and the present disclosure is not limited to one type of time stamp confinement.

As a very simplistic example of how the time stamps can be used to temporally confine the analysis of the movement patterns, the following scenario can be realized. Two persons are located within the real-world target field 20, wherein one of them is running and the other one standing still. The motion-triggered data will thus include one read value for the person running and another for the person standing still. Moreover, the image recognition and/or object tracking functionality will observe movement of the person running and no movement of the person standing still. Accordingly, for each time unit, the time stamps associated with the motion-triggered data and the video frames of the person running will be temporally confined to one another. Alternatively put, the time stamp of the motion-triggered data related to the person running will correlate to the time stamp of the video frames of the same person. Similarly, the time stamps associated with the motion-triggered data and the video frames of the person standing still will be temporally confined to one another. The movement pattern analysis unit 250 may thus analyze the correct first and second movement patterns for each one of the persons, thereby being able to distinguish between them. Analysis based on time stamps may be equally realized for other scenarios wherein any number of persons are performing any type of motion-triggered events. The temporal confinement may vary depending on e.g. system requirements, network performances, and/or accuracy demands. For instance, the analyzing of the first and second movement patterns for matches may be temporally confined with respect to a particular time unit (e.g. ns, μs, ms, s, or generally any arbitrary period of time).

In one embodiment, the movement pattern analysis unit 250 may be configured to adjust the time stamps of the motion-triggered data and/or the video frames. Adjusting of the time stamps may be useful in some scenarios when the accuracy of the pattern matching is below a pattern matching threshold. The pattern matching threshold may be indicative of a minimum performance requirement that the analyzing 150 step is required to have in order to provide a trustworthy match in movement patterns. For instance, the pattern matching threshold may be a predetermined value, such as e.g. 99% or 80% accuracy. Alternatively, the pattern matching threshold may vary depending on different characteristics of, for instance, the real-world target field 20, the persons acting thereon, the system requirements, and so forth.

The adjusting of the time stamps is typically based on the machine learning based correlation factor, and in some cases any other type of performance indicator. Accordingly, upon the machine learning based correlation factor being below the pattern matching threshold, either one of the motion-triggered data and/or the video frames currently not being properly synchronized in relation to each other, and the time stamps thereof, are consequently being adjusted.

In one embodiment, adjusting the time stamps of the motion-triggered data and/or the video frames may involve configuring real-time system clock frequencies associated with any of the components of the data processing system 200. Alternatively, adjusting the time stamps in relation to each other may be performed using other technologies known in the art.

The data processing system 200 further comprises a pattern identification unit 260. The pattern identification unit 260 is configured to identify a person having its second movement pattern being associated with the sensor data that comprises the motion-triggered data from which the first movement pattern was determined. Accordingly, based on a match between the first and second movement patterns, the pattern identification unit 260 is capable of accurately identifying a particular person within the real-world target field 20 (cf. step 160 in FIG. 5).

The data processing system 200 may further comprise a video augmenting and production unit 276. The video augmenting and production unit 276 may be configured to produce an output video stream 28 from the video stream, wherein the output video stream 28 comprises computer-generated visual augmentation(s) associated with one or more of the identified persons. In one embodiment, the video augmenting and production unit 276 comprises an entirely new output video stream 28 comprising just a few of the features of the original video stream. The new output video stream 28 may, for instance, replace the appearance of the real-world target field 20, the persons located within the field 20, and/or some other type of features. Alternatively, and beneficially, the video augmenting and production unit 276 may maintain the original video stream, and add one or more computer-generated visual augmentations onto the original video stream. Consequently, the output video stream 28 may be closely similar to the original video stream and in effect constitute an Augmented Reality (AR) version of the original video stream. Yet alternatively, the output video stream 28 may range anywhere between a completely new output stream 28 and just one or a few computer-generated visual augmentations. Examples of computer-generated visual augmentations will be discussed later on with reference to FIGS. 3-4.

The data processing system 200 may further comprise a video streaming unit 274. The video streaming unit 274 may be configured to stream the output video stream 28 onto the data network 30. This allows for the plurality of client devices 50*a*-*n* to receive and present the output video stream 28 on a display 52*a*-*n* of each client device 50*a*-*n*. Accordingly, the client devices 50*a*-*n* may present the output video streams 28, including the computer-generated visual augmentation(s) on their associated displays 52*a*-*n*.

The data processing system 200 may further comprise an ambiguity resolving unit 278. For certain events in the real-world field 20, two or more persons may appear approximately at the same location. It may therefore be difficult for the image recognition and object tracking functionality to accurately single out and track different person moving or acting in the field 20. Such events include e.g. during corners, free-kicks, penalties, etc. In these situations, visual occlusion among the two or more persons in the field 20 may occur e.g. when a person is hidden behind another, or a group of persons are clustered. The ambiguity resolving unit 278 may therefore be configured to analyze unique identifiers comprised in the sensor data for resolving ambiguities among two or more of the plurality of persons appearing in the video stream.

The unique identifiers comprised in the sensor data may be any type of identifier that can uniquely distinguish a person from another. For instance, each sensor device that is worn by or otherwise associated with a respective person may be assigned a device ID or person ID which is registered for the person in question in the data processing system 200. The device ID or person ID may advantageously be communicated in or together with the sensor data in the wireless communication signal from the sensor device, as received by the data receiving unit 210.

In some embodiments, the ambiguity resolving unit 278 may operate on body or movement related atypical features being unique for the respective persons. Such features may be associated with a particular type of movement of one or more body parts, alone or in combination, that stands out from what is considered to represent a normal movement or acting behavior. For instance, it is common that different persons have one or more movement outliers such as varying degrees of limp legs, bow-legged, knock-knees, restricted left arm movement, unnatural head movement, and so forth. In some embodiments, such atypical features may be registered on beforehand in the data processing system 200, for instance by an administrator of the system 200. In other embodiments, such atypical features may be obtained as a result of artificial intelligence performed by any of the units 240, 250 and 260.

In one or more embodiments, the data processing system 200 may be configured for improving the performance of the image recognition and object tracking functionality. The functionality may be improved based on feedback received from matches between the first and second movement patterns (e.g. from the unit 250). The image recognition and object tracking functionality may apply a self-learning algorithm in this regard. Accordingly, upon having determined that a matching between the first and second movement patterns has been correctly performed, the matching confidence of the functionality may be improved. This may lead to an improved object tracking and image recognition for performing future analyses based on historic performance. Self-learning algorithms may be based on known supervised or unsupervised learning algorithms such as e.g. regression algorithms, decision trees, K-means, K-nearest neighbors, neural networks, support vector machines or principal component analyses.

In one or more embodiments, the data processing system 200 may be configured to manage poor sensor readings and/or inaccurate video acquiring. Poor sensor readings may occur for instance when any sensor has been damaged due to collisions, wear and tear, weather conditions, or malfunctioning of electronic components. Inaccurate video acquiring may occur for instance during visual occlusion of two or more players, malfunctioning of electronic components, poor detection accuracy due to inaccurate algorithm implementation, physical camera lens obstruction, poor lighting conditions or poor visibility conditions. Poor sensor readings and/or inaccurate video acquiring may lead to a match between the first and second movement patterns not being possible to establish for a particular time. Accordingly, the data processing system 200 may thus be configured to postpone the next iteration of identifying of a person (e.g. step 160 in FIG. 5) until one of a new first or second movement pattern has been determined. The resulting output video stream 28 may thus preferably comprise as high identification confidence level as possible.

Figure 2:
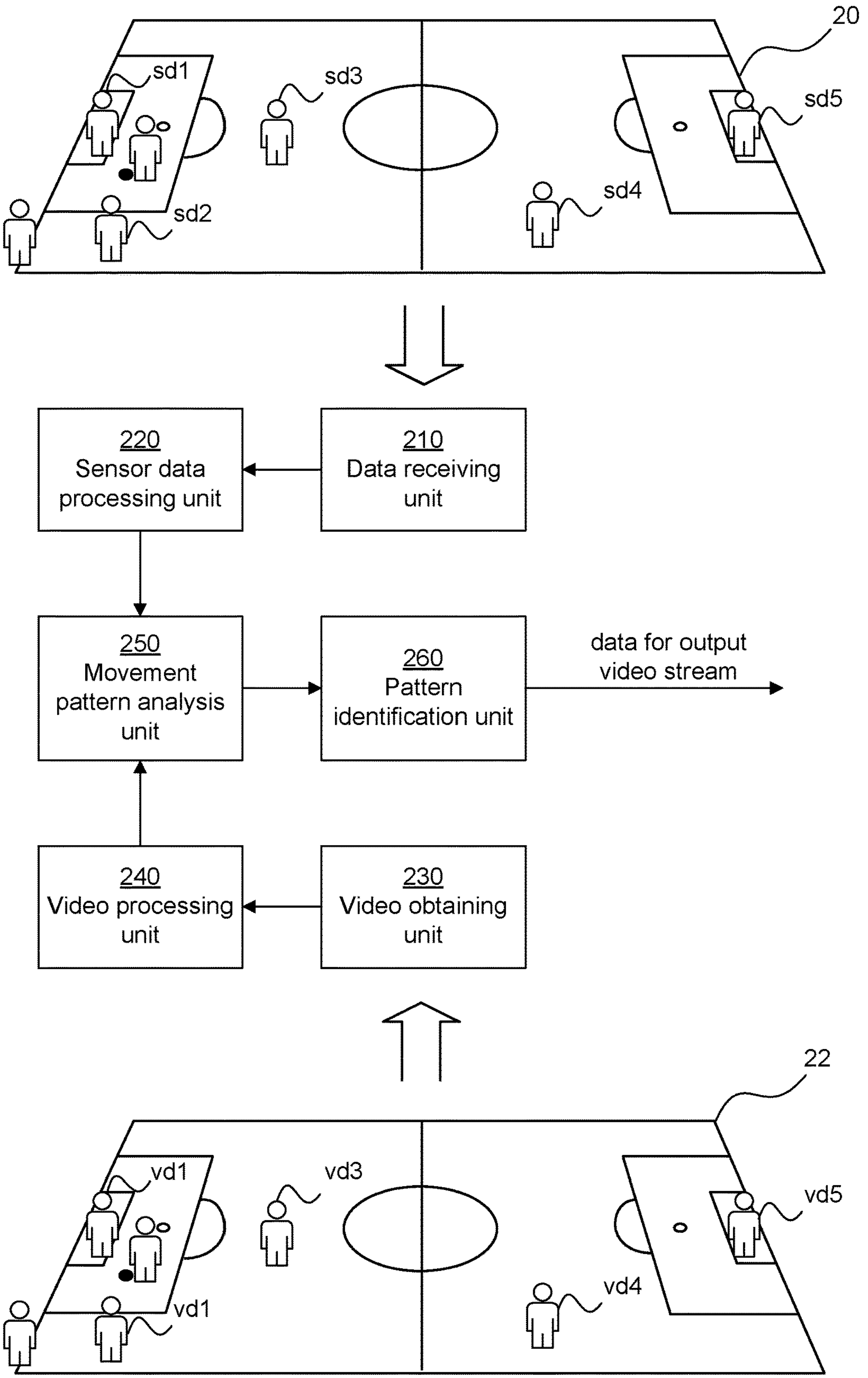
FIG. 2 is an illustrative image of matching movement patterns according to an embodiment.

With reference to FIG. 2, a schematic illustration of how data flows in the data processing system 200 is shown, according to one embodiment. The illustration depicts, at the top of the figure, the real-world target field 20. Within the real-world target field 20, there are a total of seven players playing football. As seen in the field 20, five of the players are carrying sensor devices that are adapted to retrieve sensor data sd1-5. In accordance with the present disclosure, the sensor data sd1-5 will be transmitted to the data receiving unit 210, processed in the sensor data processing unit 220 and converted into first movement patterns for each one of the players.

Also seen in FIG. 2, at the bottom of the figure, is another real-world target field 20. This field 20 is a video representation 22 of the real-world target field 20 shown at the top. Accordingly, upon the video representation 22 of the real-world target field 20 being analysed, video data vd1-5 of the five players are acquired, and transmitted to the video obtaining unit 230. Further, the video processing unit 240 is configured to process the obtained video data vd1-5 and convert the video data vd1-5 into second movement patterns for each one of the players. Subsequently, data related to the movement patterns from the sensor data processing unit 220 and video processing unit 240 flows to the movement pattern analysis unit 250, which is configured to analyze the patterns for matches. Finally, the pattern identification unit 260 is configured to, based on the matches, identify which persons on the pitch that is associated with which particular movement patterns.

Figure 3:
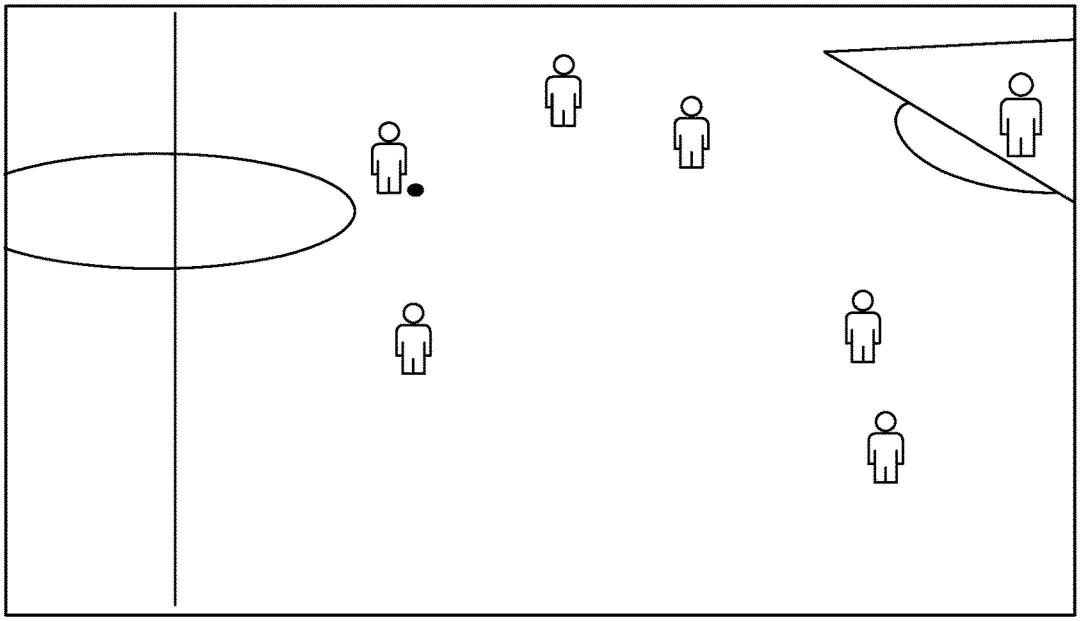
FIG. 3 is an illustrative image of a video production according to one embodiment.
Figure 3:
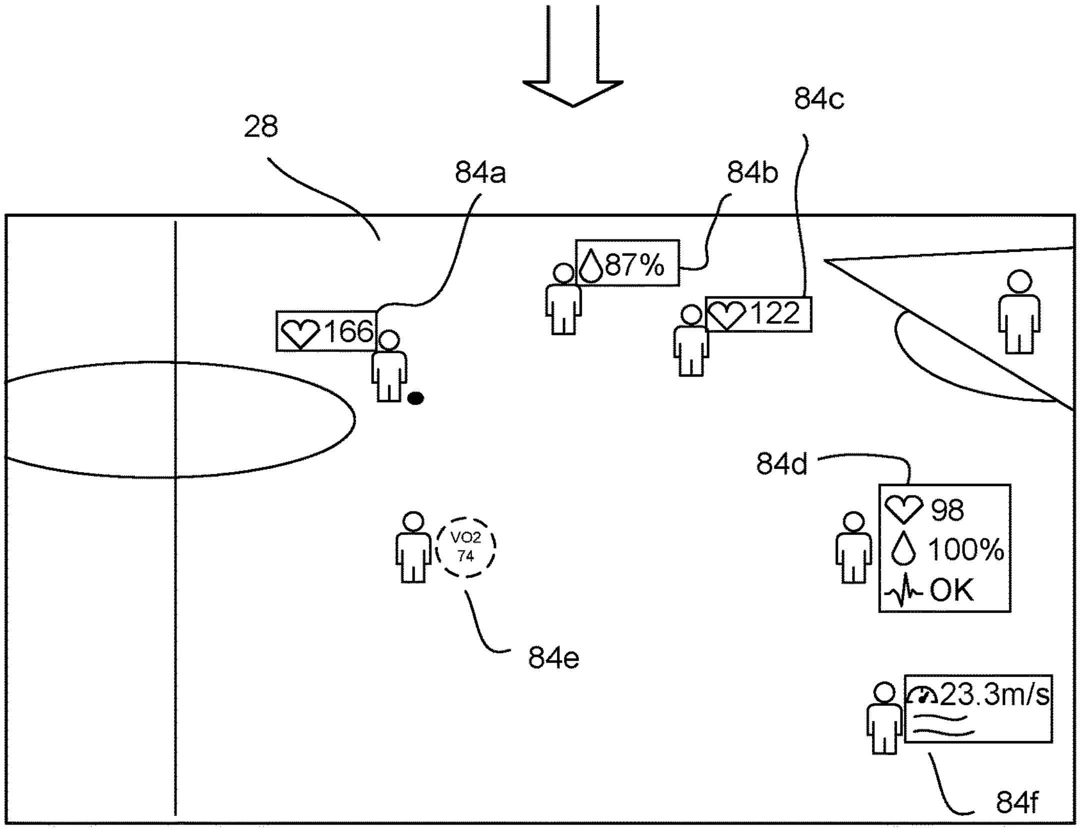
Figure 4:
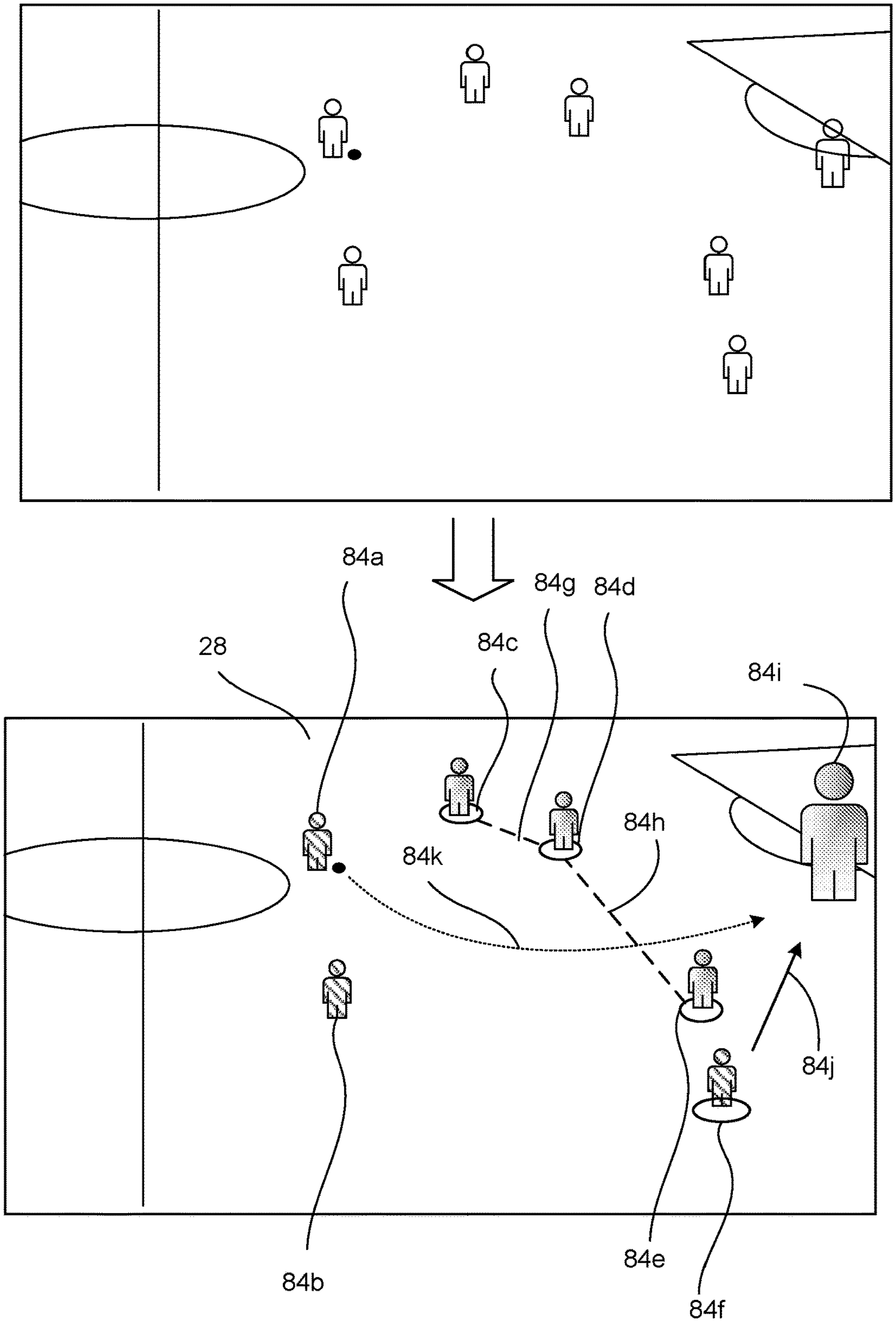
FIG. 4 is an illustrative image of a video production according to another embodiment.

In FIGS. 3 and 4, examples of computer-generated visual augmentations 84 to be included in the output video stream 28 are shown. The shown computer-generated visual augmentations 84 are merely to be interpreted as examples of augmentations, and the output video stream 28 is not limited to having these particular augmentations. Any other type of similar, alternative, fewer or additional augmentations may be realized which are in line with the present disclosure.

In one or more embodiments, shown partly in FIG. 3, the computer-generated visual augmentations include a reproduction of some or all of the biometrical data obtained for the identified person. Examples seen in the illustration are related to heart rate 84*a* and 84*c-d*, body fluid level 84*b* and 84*d*, VO2 max 84*e*, and ECG data 84*d*.

In one or more embodiments, shown partly in FIG. 3, the computer-generated visual augmentations include a reproduction of some or all of the motion-triggered data obtained for the identified person. The example seen in the illustration is related to current running velocity 84*f* of the player being 23.3 m/s.

In one or more embodiments, shown partly in FIG. 4, the computer-generated visual augmentations include one or more of the following: player highlight augmentations 84*a-f*, distance markers 84*g-h*, player magnification augmentation 84*i*, predicted player movement 84*j*, and projected ball movement path 84*k*.

Figure 5:
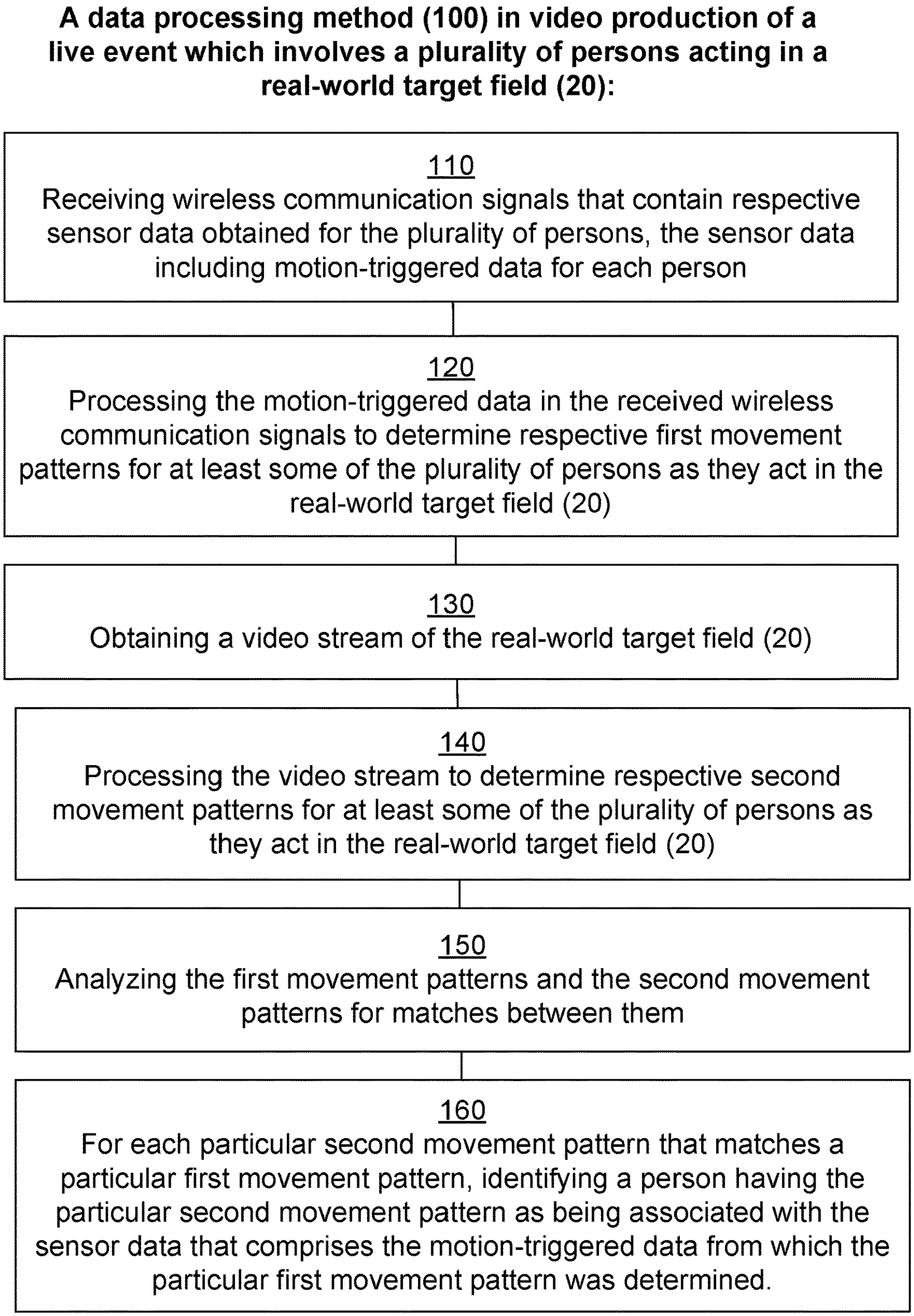
FIG. 5 is a flowchart diagram illustrating a data processing method in video production of a live event according to an embodiment.

As already mentioned, FIG. 5 shows a flowchart diagram of a method 100 in video production of a live event which involves a plurality of persons acting in a real-world target field 20. The steps 110, 120, 130, 140, 150 and 160 of the method 100, are to be performed generally by a data processing system, such as the data processing system 200 according to foregoing embodiments described in the present disclosure. Furthermore, the functionality of any of the embodiments described or referred to in this document but not shown among the method steps 110, 120, 130, 140, 150 and 160 may be performed by the data processing system 200.

A computer program product comprising computer code for performing the computerized method 100 according to FIG. 4 when the computer program code is executed by a processing device may be provided. The processing device may, for instance, be one or more CPUs in the data processing system 200, or any external CPU capable of performing the disclosed method steps 110, 120, 130, 140, 150 and 160.

The term first and second movement patterns as has been described in the present disclosure is merely a representation of how a person moves around, or how an object changes its position over time. A first movement pattern can therefore alternatively be interpreted as a sequence of anatomical/biomechanical movements having spatially and temporally common elements for a particular person, e.g. movements of body limbs occurring for one person in a plane (real-world target field 20). Movement (or motion) patterns can also be explained as a sequence including one or more changes in displacement, distance, velocity, acceleration, speed or time with respect to the plane. The difference between the first and second movement patterns is how they are generated. As has been discussed herein, the motion-triggered data is typically unorganized data obtained from one or more sensor units and comprises varying levels of noise. The first movement patterns are said motion-triggered data being organized by processing methods, such as for instance preprocessing and/or noise reduction methods. The video data are raw video segments, wherein each raw video segment may contain recorded video contents, for instance, in the form of H.264 or H.265 encoded video data. The second movement patterns are said video data being processed for instance by applying image recognition and object tracking functionality to the recorded video contents.

The data processing method and system has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A data processing method in video production of a live event involving a plurality of persons acting in a real-world target field, the data processing method comprising:

receiving wireless communication signals that contain respective sensor data obtained for the plurality of persons, the sensor data including motion-triggered data for each person;

processing the motion-triggered data in the received wireless communication signals to determine respective first movement patterns for at least some of the plurality of persons as they act in the real-world target field;

obtaining a video stream of the real-world target field;

processing the video stream to determine respective second movement patterns for at least some of the plurality of persons as they act in the real-world target field;

analyzing the first movement patterns and the second movement patterns for matches between them; and for each particular second movement pattern that matches a particular first movement pattern, identifying a person having the particular second movement pattern as being associated with the sensor data that comprises the motion-triggered data from which the particular first movement pattern was determined;

wherein the analyzing of the first movement patterns and the second movement patterns for matches between them comprises:

generating a machine learning based correlation factor, the machine learning based correlation factor being trained on said motion-triggered data and said video stream, the machine learning based correlation factor recognizing one or more correlations between the first and second movement patterns; and associating the one or more correlations with a relevance level including normalized values of different actions associated with the plurality of persons acting in the real-world target field, wherein said one or more correlations are sorted based on respective relevance levels;

wherein the motion-triggered data in the sensor data as well as video frames of the obtained video stream comprise time stamps, and wherein the analyzing of the first movement patterns and the second movement patterns for matches between them is temporally confined by use of the time stamps, and wherein based on the machine learning based correlation factor, the method further comprises:

defining a pattern matching threshold as a predetermined value being indicative of a minimum performance requirement of the analyzing step; and adjusting the time stamps of the motion-triggered data and/or the video frames upon the machine learning based correlation factor being below the pattern matching threshold.

2. The data processing method as defined in claim 1, wherein the motion-triggered data in the sensor data obtained for each person are data from a gyro, accelerometer, magnetometer or inertial measurement unit comprised in a sensor device attached to the body of the person.

3. The data processing method as defined in claim 1, wherein, in addition to motion-triggered data, the sensor data obtained for each person also comprises biometrical data.

4. The data processing method as defined in claim 1, further comprising:

producing an output video stream from the video stream, the output video stream having one or more computer-generated visual augmentations associated with one or more of the identified persons.

5. The data processing method as defined in claim 4, wherein the one or more computer-generated visual augmentations include a reproduction of biometrical data comprised in the sensor data obtained for the identified person.

6. The data processing method as defined in claim 5, wherein the one or more computer-generated visual augmentations include a reproduction of some or all of the motion-triggered data obtained for the identified person.

7. The data processing method as defined in claim 1, further comprising:

streaming the output video stream onto a data network for allowing a plurality of client devices to receive and present the output video stream on a display of each client device.

8. The data processing method as defined in claim 1, wherein the processing of the video stream to determine respective second movement patterns for at least some of the plurality of persons as they act in the real-world target field involves:

applying image recognition and object tracking functionality to a sequence of video frames of the video stream to single out and track different persons acting in the field; and deriving the respective second movement patterns from an output of the image recognition and object tracking functionality.

9. The data processing method as defined in claim 1, wherein the sensor data comprises a unique identifier being adapted to uniquely distinguish a person among the plurality of persons appearing in the video stream, the method further comprising:

analyzing the unique identifier for resolving ambiguities of said person among the plurality of persons appearing in the video stream.

10. The data processing method as defined in claim 9, wherein the unique identifier is used for resolving ambiguities resulting from a temporary incapability of the image recognition and object tracking functionality to single out and track different persons acting in the field in the sequence of video frames of the video stream.

11. The data processing method as defined in claim 8, further involving:

improving the performance of the image recognition and object tracking functionality based on feedback received from matches between the first and second movement patterns.

12. The data processing method as defined in claim 1, wherein upon no match between the first and second movement patterns having been established for a particular time, the method further involves postponing a next iteration of the identifying of a person until one of a new first or second movement pattern has been determined.

13. A data processing system in video production of a live event involving a plurality of persons acting in a real-world target field, the data processing system comprising:

a data receiving unit configured to receive wireless communication signals that contain respective sensor data obtained for the plurality of persons, the sensor data including motion-triggered data for each person;

a sensor data processing unit configured to process the motion-triggered data in the received wireless communication signals to determine respective first movement patterns for at least some of the plurality of persons as they act in the real-world target field;

a video obtaining unit configured to obtain a video stream of the real-world target field;

a video processing unit configured to process the video stream to determine respective second movement patterns for at least some of the plurality of persons as they act in the real-world target field;

a movement pattern analysis unit configured to analyze the first movement patterns and the second movement patterns for matches between them; and a pattern identification unit configured to, for each particular second movement pattern that matches a particular first movement pattern, identify a person having the particular second movement pattern as being associated with the sensor data that comprises the motion-triggered data from which the particular first movement pattern was determined;

wherein the movement pattern analysis unit is configured such that analyzing of the first movement patterns and the second movement patterns for matches between them comprises:

generating a machine learning based correlation factor, the machine learning based correlation factor being trained on said motion-triggered data and said video stream, the machine learning based correlation factor recognizing one or more correlations between the first and second movement patterns; and associating the one or more correlations with a relevance level including normalized values of different actions associated with the plurality of persons acting in the real-world target field, wherein said one or more correlations are sorted based on respective relevance levels;

wherein the motion-triggered data in the sensor data as well as video frames of the obtained video stream comprise time stamps, and wherein the analyzing of the first movement patterns and the second movement patterns for matches between them is temporally confined by use of the time stamps, and wherein based on the machine learning based correlation factor, the movement pattern analysis unit is further configured to:

define a pattern matching threshold as a predetermined value being indicative of a minimum performance requirement of the analyzing step; and adjust the time stamps of the motion-triggered data and/or the video frames upon the machine learning based correlation factor being below the pattern matching threshold.

14. A non-volatile computer program product stored on a tangible computer readable medium and comprising computer code for performing a data processing method when the computer program code is executed by a processing device, the data processing method being in video production of a live event involving a plurality of persons acting in a real-world target field, the data processing method comprising:

receiving wireless communication signals that contain respective sensor data obtained for the plurality of persons, the sensor data including motion-triggered data for each person;

processing the motion-triggered data in the received wireless communication signals to determine respective first movement patterns for at least some of the plurality of persons as they act in the real-world target field;

obtaining a video stream of the real-world target field;

processing the video stream to determine respective second movement patterns for at least some of the plurality of persons as they act in the real-world target field;

analyzing the first movement patterns and the second movement patterns for matches between them; and for each particular second movement pattern that matches a particular first movement pattern, identifying a person having the particular second movement pattern as being associated with the sensor data that comprises the motion-triggered data from which the particular first movement pattern was determined;

wherein the analyzing of the first movement patterns and the second movement patterns for matches between them comprises:

generating a machine learning based correlation factor, the machine learning based correlation factor being trained on said motion-triggered data and said video stream, the machine learning based correlation factor recognizing one or more correlations between the first and second movement patterns; and associating the one or more correlations with a relevance level including normalized values of different actions associated with the plurality of persons acting in the real-world target field, wherein said one or more correlations are sorted based on respective relevance levels;

wherein the motion-triggered data in the sensor data as well as video frames of the obtained video stream comprise time stamps, and wherein the analyzing of the first movement patterns and the second movement patterns for matches between them is temporally confined by use of the time stamps, and wherein based on the machine learning based correlation factor, the method further comprises:

defining a pattern matching threshold as a predetermined value being indicative of a minimum performance requirement of the analyzing step; and adjusting the time stamps of the motion-triggered data and/or the video frames upon the machine learning based correlation factor being below the pattern matching threshold.

* * * * *